United States Patent
Garcia-Martin et al.

(10) Patent No.: US 6,882,638 B1
(45) Date of Patent: Apr. 19, 2005

(54) SIGNALLING IN A TELECOMMUNICATIONS SYSTEM

(75) Inventors: Miguel-Angel Garcia-Martin, Madrid (ES); Juan Maria Garcia Gonzales, Madrid (ES)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/787,738
(22) PCT Filed: Sep. 23, 1999
(86) PCT No.: PCT/EP99/07067
§ 371 (c)(1), (2), (4) Date: Jun. 22, 2001
(87) PCT Pub. No.: WO00/19739
PCT Pub. Date: Apr. 6, 2000

(30) Foreign Application Priority Data

Sep. 25, 1998 (FI) ................................. 972074

(51) Int. Cl.[7] ................................. H04Q 3/00
(52) U.S. Cl. ................................. 370/352; 370/466
(58) Field of Search ................................. 455/550.1, 560, 455/414.4; 370/351, 352, 353, 355, 356, 465, 466, 467, 400, 401

(56) References Cited

U.S. PATENT DOCUMENTS 5,706,286 A 1/1998 Reiman et al.
5,793,771 A 8/1998 Darland et al.
6,757,552 B1 * 6/2004 Garcia-Martin et al. .... 455/560

FOREIGN PATENT DOCUMENTS

WO WO97/42774 11/1997

OTHER PUBLICATIONS

M. Sevcik et al., "Customers in Driver's Seat: Private Intelligent Network Control Point", Proceedings of the International Switching Symposium, DE, Berlin, VDE Verlag, vol. SYMP. 15, pp. 41–44.

* cited by examiner

Primary Examiner—Chi Pham
Assistant Examiner—Derrick W Ferris

(57) ABSTRACT

A method of transmitting signalling information in a Public Land Mobile Network (PLMN) between a pair of peer application part. An adaptation layer is interposed between the SCCP of an SS7 network and a TCP/IP part to allow signalling data to be transmitted to and from the SCCP via an IP based network. The adaptation layer provides for translation between Destination Point Codes (DPCs) and or global titles, used as addresses in the SS7 network, and IP addresses/port numbers for use in the IP network. The adaptation layer also provides for formatting of SCCP messages suitable for processing by the TCP/IP layers, and also for formatting signalling information flowing in the reverse direction.

8 Claims, 2 Drawing Sheets

SIGNALLING IN A TELECOMMUNICATIONS SYSTEM

FIELD OF THE INVENTION

The present invention relates to signalling in a telecommunications system and in particular, though not necessarily, to the transmission of signalling data in a Public Land Mobile Network.

BACKGROUND TO THE INVENTION

In a telecommunications system, signalling equipment and signalling channels are required for the exchange of information between system elements or nodes. In particular, this internode signalling informs the nodes of what is to be performed when a telephone or data call is to be set up or released in so-called "circuit-switched" connections. Signalling is also often used to communicate information on the status of the system and of individual subscribers.

Modern telecommunications systems now largely make use of Common Channel Signalling (CCS) whereby signalling information is transmitted on one or more dedicated signalling channels, distinct from the channels used to carry actual user information (e.g. voice or data). An important feature of CCS is that the same signalling system may support services in a variety of existing telecommunications networks, e.g. Public Switched Telephone Network (PSTN), Integrated Services Digital Network (ISDN), and Public Land Mobile Networks (PLMN), as well as proposed future protocols such as B-ISDN, enhancing greatly the interoperability of networks supporting different protocols.

Currently, the predominant CCS is known as Signalling System Number 7 (SS7), defined in the ITU-T (International Telecommunications Union—Technical) recommendations starting with Q.700. SS7 is a packet switched system occupying one time slot per frame of the Time Division Multiple Access (TDMA) E.1 or T.1 transmission formats (the other time slots being available for user voice or data information).

Individual signalling message packets (referred to as Message Signalling Units or MSUs) are associated with respective individual telephone calls. As only a relatively small amount of signalling information is associated with a single telephone call, a single SS7 channel is able to handle all signalling between two network nodes (termed "signalling points") for several thousands of calls. It is noted that the route taken by an MSU in the SS7 network may be the same as that over which the associated telephone call is established, or it may be different.

As already noted, SS7 (along with other CCS systems) is able to support a number of different telecommunications networks (e.g. PSTN, ISDN, PLMN). In signal processing terms, SS7 comprises a Message Transfer Part (MTP) which deals with the physical transfer of signalling information over the signalling network (MTP layer 1), message formatting, error detection and correction, etc (MTP layer 2), and message routing (MTP layer 3). SS7 also comprises user parts and application parts which allow several "users" (i.e. ISDN User Part, Telephony User Part, Mobile Application Part, etc) to send signals in the same signalling network.

FIG. 1 illustrates a PLMN (GSM) having a Gateway Mobile Switching Centre (GMSC) 1 which provides an interface for the PLMN to "foreign" networks such as ISDNs, PSTNs, and other PLMNs. An exemplary Mobile Station (MS), registered to the PLMN, is indicated by the reference numeral 2. A number of exemplary nodes within the PLMN are also shown including: the GMSC 1; a Mobile Switching Centre (MSC) 3; a Base Station Controller (BSC) 4; a Base Transceiver Station (BTS) 5; an Intelligent Network node (IN) 6; a Visitor Location Register (VLR) 7; a Home Location Register (HLR) 8; an Authentication Centre (AUC) 9; and an Equipment Identity Register (EIR) 10. A more complete description of a PLMN, and other aspects of telecommunication networks, is given in "Understanding Telecommunications", vols. 1 & 2, Studentlitteratur, Lund, Sweden (ISBN 91-44-00214-9).

FIG. 1 indicates the various signalling interfaces which are used to signal between the network nodes detailed above. These interfaces include: the ISUP/TUP interfaces between the GMSC 1 and the foreign networks; the INAP interface used between the MSC 3 and Intelligent Network (IN) nodes; the MAP interface used between the MSC/GMSC 1,3 and PLMN specific nodes (VLR, HLR, AUC, EIR) 6–10; the BSSMAP used between the MSC 3 and the BSC 4; and the Abis interface between the BSC 4 and the BTS 5. Conventionally, all of these interfaces serve as user parts and application parts of an SS7 network, residing above the MTP layers. The resulting protocol stacks are illustrated in FIG. 2.

In order to provide the INAP and MAP (as well as certain other application parts, e.g. OMAP, which also rely upon connectionless communication over the signalling network) with certain functions and protocols as well as a standard and common interface between the application parts and the network signalling service, a Transaction Capabilities Application Part (TCAP or TC) is interposed between these application parts and the MTP.

Furthermore, a Signalling Connection and Control Part (SCCP) is interposed between the TCAP and the MTP for controlling the signalling connection. The SCCP is also used by certain other application parts (referred to as SCCP users, e.g. BSSMAP) which do not use the services of the TCAP and which rely upon connection-oriented and/or connectionless communication over the signalling network.

SS7 makes use of addresses known as Destination Point Codes (DPCs) to route signalling data through the "visibility area" of a telecommunications network, the visibility area typically being the network itself together with the interfaces between the network and "foreign" networks under the control of other operators. A DPC is placed in the header of an MSU and is examined by a network signalling point (SP) upon receipt of the MSU to determine the next hop for the MSU en route to its destination. So-called Subsystem Numbers (SSNs) are used by SS7 to direct data to specific application parts (see below) and are also included in MSUs.

With reference to FIG. 2, it is noted that routing between various application parts above the SCCP layer is achieved using so-called "global titles". A global title contains (amongst other things) a number dialled in the PLMN or the number of a roaming mobile station (for the specific example shown in FIG. 1). The SCCP contains all the network and routing information required to analyse a global title and translate it into a DPC and, optionally, a Subsystem Number (SSN) which identify the next or final signalling point in the SS7 network.

In an SS7 network, any change in the DPC allocation within the visibility area requires the operator to update the DPC database (or routing table) which exists in each SP of the network. This however adds significantly to the maintenance overheads of the network. The dedicated nature of SS7 makes it in general expensive to install and maintain (in relation to both hardware and software), a significant barrier especially to prospective new telecom operators. Furthermore, as an SS7 network occupies bandwidth on TDMA frames of the E.1/T.1 transmission protocols (one slot per time frame), the bandwidth available for actual user call data is restricted. Yet another disadvantage of traditional signalling architectures is that the interoperability of SS7 networks is limited due to the dedicated nature of the MTP physical layers.

SUMMARY OF THE PRESENT INVENTION

It is an object of the present invention to overcome or at least mitigate the above noted disadvantages of existing telecommunication signalling systems.

According to a first aspect of the present invention there is provided a method of transmitting signalling information in a telecommunications network between a pair of application parts, the method comprising;

generating said signalling information at a first of said application parts, including addressing information associated with the second of the application parts;

passing the signalling information to a Signalling Connection Control Part (SCCP) arranged to segment the signalling information if necessary, and to encapsulate the information in one or more SCCP messages;

passing the encapsulated signalling information from the SCCP to an adaptation layer arranged to determine an IP address and port number associated with said addressing information;

passing the signalling information and said IP address and port number to an Internet Protocol (IP) part and transmitting the signalling information over an IP network to said IP address in one or more IP datagrams;

decapsulating said signalling information at the destination associated with the IP address and at an adaptation layer identified by said port number; and routing the decapsulated signalling information to the second user part.

The use of the IP based network for transmitting signalling information reduces the need for conventional signalling infrastructure (although this may still be used in part). IP based networks offer increased flexibility (e.g. routers of the network have self-updating routing tables) and reduced operating, maintaining, and engineering costs in comparison with conventional telecommunications signalling networks.

The method of the present invention is particularly applicable to Public Land Mobile Networks (PLMN), where said pair of application parts may be, for example, peer Mobile Application Parts (MAPs) or Intelligent Network Application Parts (INAPs) present at respective signalling nodes of the PLMN.

In certain embodiments of the invention, the SCCP performs a translation between said addressing information (e.g. a global title) and an associated Destination Point Code (DPC) and, optionally, a Subsystem Number (SSN). In this case, the IP address and port number are determined, at the adaptation layer, by way of the DPC, rather than directly from the global title. In other embodiments however, the IP address and port number are obtained at the adaptation layer directly from a global title.

Preferably, the adaptation layer is arranged to monitor the state of the signalling connection over the IP based network and to report on this to the SCCP.

Preferably, the signalling information is passed from the adaptation layer to the IP part via a UDP or TCP encapsulating layer. More preferably, the adaptation layer is arranged to encapsulate signalling and addressing information into a form suitable for further processing by the UDP or TCP layers.

The signalling information generated at the first application part may be passed to the SCCP via a Transaction Capabilities Application part. Alternatively, the application part may pass information directly to the SCCP. It is noted that a function of the SCCP is to facilitate both connectionless and connection oriented communication over the signalling channel, in addition to its routing and encapsulation functions.

According to a second aspect of the present invention there is provided apparatus for transmitting signalling information in a telecommunications network between a pair of application parts, the apparatus comprising;

generating means for generating said signalling information at a first of said application parts, including addressing information associated with the second of the application parts;

a Signalling Connection Control Part (SCCP) arranged to receive said signalling information and to segment the signalling information if necessary, and to encapsulate the information in one or more SCCP messages;

an adaptation layer arranged to receive the encapsulated signalling information and to determine an IP address and port number associated with said addressing information;

an Internet Protocol (IP) part receiving the signalling information and said IP address and port number and for arranging transmission of the signalling information over an IP network to said destination IP address in one or more IP datagrams;

an adaptation layer at the destination associated with the IP address, and identified by said port number, for decapsulating said signalling information; and routing means for routing the signalling information to the second user part.

According to a third aspect of the present invention there is provided a gateway node for coupling signalling information from a common channel signalling (CCS) network, of a telecommunications system, to an Internet Protocol (IP) based network, the gateway node comprising:

a Message Transfer Part (MTP) arranged to receive signalling information over the CCS network;

a Signalling Connection Control Part (SCCP) arranged to receive said signalling information from the MTP whilst controlling the signalling connection over the CCS network;

an adaptation layer arranged to receive said signalling information from the SCCP in the form of one or more SCCP messages, to determine an IP address and port number associated with a global title or Destination Port Code (DPC) included in the SCCP message(s), and to control the connection over the IP based network;

an IP layer for receiving the signalling information and the IP address and port number from the adaptation layer and for arranging for transmission of the signalling information over the IP based network in the form of IP datagrams.

BRIEF DESCRIPTION OF THE DRAWINGS

For a better understanding of the present invention and in order to show how the same may be carried into effect reference will now be made, by way of example, to the accompanying drawings, in which.

DETAILED DESCRIPTION OF CERTAIN EMBODIMENTS

Figure 1:
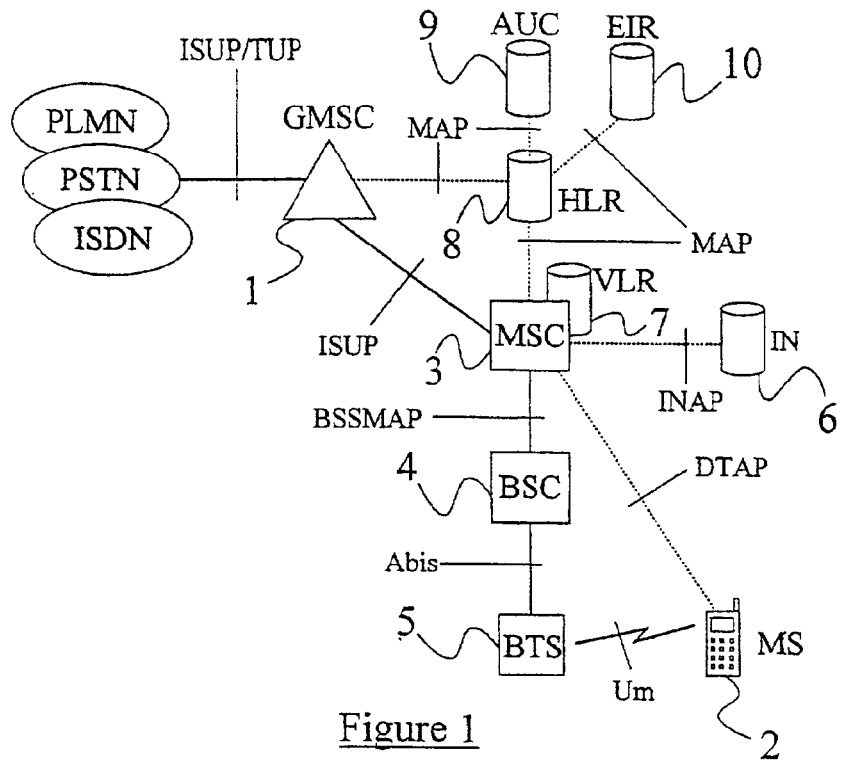
FIG. 1 illustrates schematically a GSM network together with the signalling protocols used therein.
Figure 2:
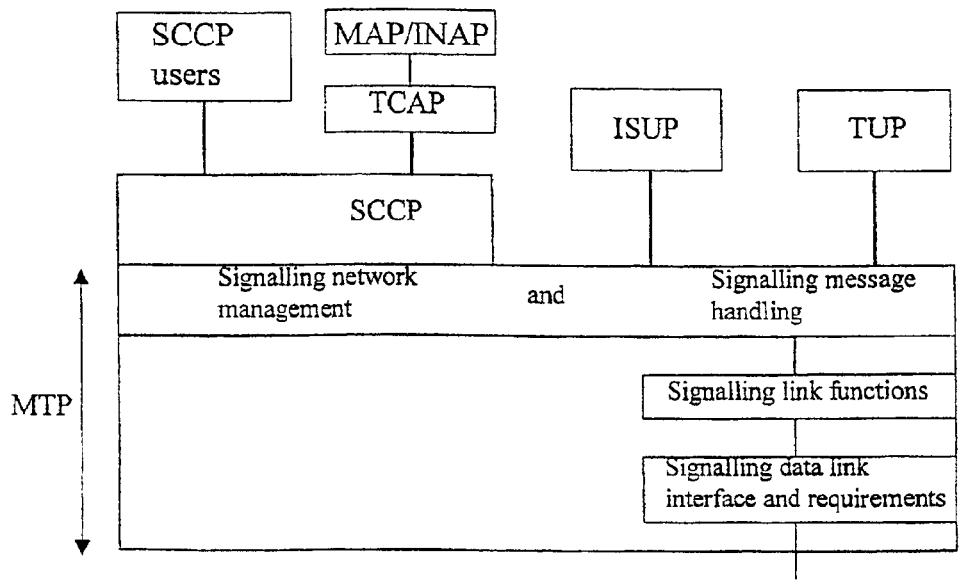
FIG. 2 illustrates schematically the signal processing layers of an SS7 protocol of the network of FIG. 1.
Figure 3:
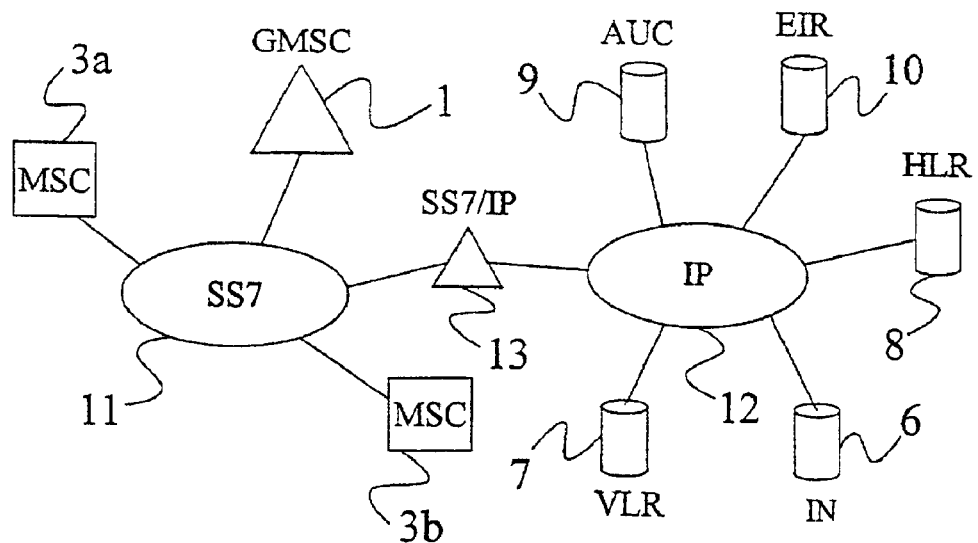
FIG. 3 illustrates schematically the use of a TCP/IP network to transmit signalling information in a telecommunications network.

The general structure in terms of signalling nodes and signalling interfaces of a GSM PLMN has already been described above with reference to FIGS. 1 and 2. FIG. 3 shows various nodes of the GSM PLMN where it is assumed, for the purpose of this discussion, that each of these nodes comprises an application part (e.g. MAP, INAP) having a conventional composition such that it can be supported by SS7 for the sending of signalling information to a peer application part at some other node. Considering in particular the MSCs 3a,3b and the GMSC 1, these nodes are connected to a conventional SS7 network 11 for the purpose of communicating signalling information.

Intelligent network and mobile network specific nodes, including the IN node 6, VLR 7, HLR 8, AUC 9, and EIR 10, each have application parts (and in particular MAP and INAP) similarly constructed for peer-to-peer communication via SS7. However, these nodes each comprise an additional interface which enables them to communicate signalling information via an IP network 12. In order to enable interworking of the SS7 connected nodes and the IP network connected nodes, the two signalling networks 11,12 are connected by a gateway node 13.

Figure 4:
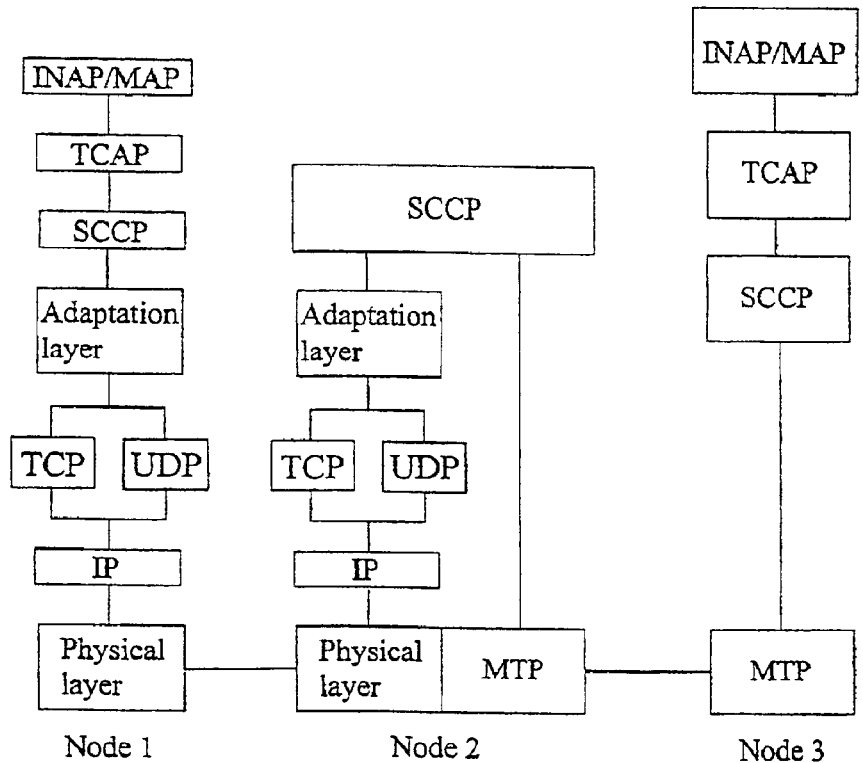
FIG. 4 illustrates signalling protocol layers present at nodes of the telecommunications network of FIG. 3.

FIG. 4 shows schematically the protocol layers present at a node connected to the IP network 12 (Node 1), at the gateway node 13 (Node 2), and at a node connected to the SS7 network 11 (Node 3). Of the layers shown, the INAP/MAP, TCAP, SCCP, TCP/UDP, IP, physical layer, and MTP are substantially conventional in structure and therefore will not be described in detail. Rather, the reader should make reference to the literature including "Understanding Telecommunications", vols. 1 & 2, Studentlitteratur, Lund, Sweden (ISBN 91-44-00214-9), and the ITU-T (International Telecommunications Union —Technical) recommendations starting with Q.700 which define Signalling System Number 7 (SS7). The present discussion is concerned in the main with the Adaptation layer which enables the TCP/IP and physical layers to replace the MTP, such that peer SCCPs can communicate over the IP network 12.

As has already been discussed above, MSUs are routed to a signalling point in an SS7 network using Destination Point Codes (DPCs) which are attached to each of the MSUs. Within a signalling point, messages are directed to a specific application (e.g. HLR, VLR, etc) on the basis of a Subsystem Number (SSN) also attached to the MSU. On the other hand, datagrams in an IP network are routed to a destination machine on the basis of an IP address, and to an application running on a particular machine on the basis of an IP port number. A main function of the Adaptation layer therefore is to translate from DPCs to IP addresses and port numbers, a process which is achieved using a database associating DPCs and IP addresses/port numbers. It is noted that translation in the reverse direction, i.e. from IP addresses/port numbers to DPCs, is not normally necessary as the MSU will in any case contain the DPC (or a global title from which the DPC can be determined).

At Node 1, for signalling data to be transmitted to Node 3, the adaptation layer determines an IP address and port number associated with the DPC/SSN contained in the message "primitive" received from the SCCP layer (this primitive is referred to as an SCCP message). The Adaptation layer then encapsulates the primitive into a format which is acceptable to the TCP (or UDP layer) before passing the information to the TCP (or UDP) layer. A further function of the Adaptation layer is to monitor the state of the connection between the two communicating peer application parts. For example, if communication between the application parts breaks down, and cannot be re-established, then the Adaptation layer may report this to the SCCP. It will be appreciated that the Adaptation layer communicates with the SCCP in a manner identical to that of the MTP.

After processing by the TCP (or UDP) layer, the messages are passed to the IP layer, the main function of which is to handle routing of datagrams over the IP network.

The messages transmitted over the IP network 12 have the following structure:

| Physical header | IP header | UDP/TCP header | SIO | SCCP header | TCAP header | INAP/MAP data |
| --- | --- | --- | --- | --- | --- | --- | where SIO is the Service Information Octet (which, in certain circumstances, may be omitted).

At the gateway node 13 (Node 2 in FIG. 4), the Adaptation layer is interposed between the TCP-UDP/IP layers and the SCCP. The adaptation layer provides again for translation between DPCs and IP addresses/port numbers. Thus, for a signalling datagram received over the IP network 12, the Adaptation layer decapsulates the message and passes it to the SCCP for further processing.

For transmission over the SS7 network 11, the SCCP passes the primitive to the MTP which handles transmission in a known manner. Similarly, the protocol layers at the receiving node (Node 3) correspond to the conventional SS7 structure.

It will be appreciated by the skilled person that various modifications may be made to the above described embodiment without departing from the scope of the present invention. For example, the connectivity of the network nodes shown in FIG. 3 may be varied, such that certain IN/PLMN specific nodes are connected to the SS7 network, whilst the MSCs and/or the GMSC may be connected to the IP network. It may also be the case that nodes are connected to both the SS7 network and the IP network, such that one network provides a back-up for the other network. It is also possible to connect all nodes to two or more SS7 networks, with these networks being connected together via an IP based networks and a number of SS7/IP gateway nodes.

In a further modification to the above embodiment, the TCAP may be omitted from the processing chain, e.g. where the user application does not require the services of the TCAP. In this case, the messages transmitted over the IP network may have the structure given below.

| Physical header | IP header | UDP/TCP header | SIO | SCCP header | SCCP user data |
| --- | --- | --- | --- | --- | --- |

What is claimed is:

1. A method of transmitting signalling information in a telecommunications network between a pair of application parts, the method comprising;

generating said signalling information at a first of said application parts, including addressing information associated with the second of the application parts;

passing the signalling information to a Signalling Connection control Part (SCCP) arranged to segment the signalling information if necessary, and to encapsulate the information in one or more SCCP messages;

passing the encapsulated signalling information from the SCCP to an adaptation layer arranged to determine an IP address and port number associated with said addressing information;

passing the signalling information and said IP address and port number to an Internet Protocol (IP) part and transmitting the signalling information over an IP network to said IP address in one or more IP datagrams;

decapsulating said signalling information at the destination associated with the IP address and at an adaptation layer identified by said port number; and routing the decapsulated signalling information to the second user part.

2. A method according to claim 1, wherein said pair of application parts are peer Mobile Application Parts (MAPs) or Intelligent Network Application Parts (INAPs) present at respective signalling nodes of a Public Land Mobile Network (PLMN).

3. A method according to claim 1 and comprising determining the IP address and port number at the adaptation layer from a Destination Point Code (DPC) included in said addressing information.

4. A method according to claim 1 and comprising obtaining the IP address and port number at the adaptation layer directly from a global title included in said addressing information.

5. A method according to claim 1 and comprising monitoring at the adaptation layer the state of the signalling connection over the IP based network and reporting on this to the SCCP.

6. A method according to claim 1 and comprising encapsulating at the adaptation layer the signalling and addressing information into a form suitable for further processing by a UDP/TCP layer disposed between the adaptation layer and the IP part.

7. Apparatus for transmitting signalling information in a telecommunications network between a pair of application parts, the apparatus comprising;

generating means for generating said signalling information at a first of said application parts, including addressing information associated with the second of the application parts;

a Signalling Connection Control Part (SCCP) arranged to receive said signalling information and to segment the signalling information if necessary, and to encapsulate the information in one or more SCCP messages;

an adaptation layer arranged to receive the encapsulated signalling information and to determine an IP address and port number associated with said addressing information;

an Internet Protocol (IP) part receiving the signalling information and said IP address and port number and for arranging transmission of the signalling information over an IP network to said destination IP address in one or more IP datagrams;

an adaptation layer at the destination associated with the IP address, and identified by said port number, for decapsulating said signalling information; and routing means for routing the signalling information to the second user part.

8. A gateway node for coupling signalling information from a common channel signalling (CCS) network of a telecommunications system, to an Internet Protocol (IP) based network, the gateway node comprising:

a Message Transfer Part (MTP) arranged to receive signalling information over the CCS network;

a Signalling Connection Control Part (SCCP) arranged to receive said signalling information from the MTP whilst controlling the signalling connection over the CCS network;

an adaptation layer arranged to receive said signalling information from the SCCP in the form of one or more SCCP messages, to determine an IP address and port number associated with a global title or Destination Port Code (DPC) included in the SCCP message(s), and to control the connection over the IP network;

an IP layer for receiving the signalling information and the IP address and port number from the adaptation layer and for arranging for transmission of the signalling information over the IP based network in the form of IP datagrams.

* * * * *